US010275707B2

(12) United States Patent
Ray

(10) Patent No.: US 10,275,707 B2
(45) Date of Patent: Apr. 30, 2019

(54) SYSTEMS AND METHODS FOR TRAINING MULTIPATH FILTERING SYSTEMS

(71) Applicant: THE BOEING COMPANY, Huntington Beach, CA (US)

(72) Inventor: Gary A. Ray, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 581 days.

(21) Appl. No.: 14/536,798

(22) Filed: Nov. 10, 2014

(65) Prior Publication Data

US 2016/0132768 A1  May 12, 2016

(51) Int. Cl.
*G06N 3/08* (2006.01)

(52) U.S. Cl.
CPC ........................ *G06N 3/08* (2013.01)

(58) Field of Classification Search
CPC ................................ G06N 3/08; H03H 17/02
See application file for complete search history.

(56) References Cited

U.S. PATENT DOCUMENTS

2014/0219327 A1* 8/2014 Kumar .................. H04L 25/03
375/232

OTHER PUBLICATIONS

Nawaz, Syed Junaid, Sajjad Mohsin, and Ataul Aziz Ikaram. "Neural network based MIMO-OFDM channel equalizer using comb-type pilot arrangement." Future Computer and Communication, 2009. ICFCC 2009. International Conference on. IEEE, 2009.*
Ray, Gary A. "Approximating non-linear parameter estimators." Digital Signal Processing Workshop, 1994., 1994 Sixth IEEE. IEEE, 1994.*
Nitta, Tohru. "An extension of the back-propagation algorithm to complex numbers." Neural Networks 10.8 (1997): 1391-1415.*
Adali, Tülay, Peter J. Schreier, and Louis L. Scharf. "Complex-valued signal processing: The proper way to deal with impropriety." IEEE Transactions on Signal Processing 59.11 (2011): 5101-5125.*
Gary A. Ray, Approximating Non-Linear Parameter Estimators, Boeing Defense and Space, dated 1994, pp. 169-172.

* cited by examiner

*Primary Examiner* — Eric Nilsson
(74) *Attorney, Agent, or Firm* — Armstrong Teasdale LLP

(57) ABSTRACT

A method for training a neural network to be configured to filter a multipath corrupted signal is provided. The method includes receiving, at the neural network, real or simulated multipath corrupted signal data, and training the neural network on the multipath corrupted signal data using a complex iterated least square thresholding algorithm (CILST) capable of processing both real and complex signals.

17 Claims, 6 Drawing Sheets

SYSTEMS AND METHODS FOR TRAINING MULTIPATH FILTERING SYSTEMS

BACKGROUND

The field of the disclosure relates generally to signals corrupted by multipath, and, more particularly, to training a neural network for filtering a multipath corrupted signal.

Government agencies (e.g., DARPA) and other entities have shown interest in utilizing multipath exploitation in radar systems, rather than simply trying to eliminate such multipath from the radar return. In addition, communications signals have long had adaptive equalization filters to eliminate multipath from the received signal to enhance communications performance. In the case of radar systems, for example, an electromagnetic scattering and propagation ray tracing system may be used to create accurate electromagnetic models for urban sensing environments. Such systems provide better modeling than previous systems that performed radar height finding using multipath returns (a particular example of multipath exploitation). In addition, bistatic radar systems may be used for multipath exploitation with spatial diversity.

At least some known multipath filtering systems utilize neural networks. However, in at least some known systems, an iterated least square thresholding (ILST) algorithm used for non-linear parameter estimation of such multipath (typically this is caused by ground bounce) has some drawbacks. For example, the ILST algorithm is inherently a real-valued algorithm, and according cannot use complex phase information optimally. Further, the ILST algorithm struggles with convergence if the associated neural network has more than a small number of hidden layer neurons. These drawbacks lead to reduced performance when applied to more general applications of estimating radar or communications returns within urban clutter or other more complex multipath scenarios. In addition, these drawbacks limit applications to more complex and diverse systems, such as arrays, biomedical imaging, automotive anti-collision radars, and electronic warfare.

Further, many existing techniques for training real or complex neural networks rely on a backpropagation algorithm. These approaches suffer from convergence problems, especially for larger networks. To combat these problems and increase accuracy and decrease convergence time, backpropagation is usually preceded by some form of global optimization to be used as a starting point. However, such global optimization methods also suffer from convergence problems and can lead to inaccurate starting points for backpropagation, which then creates additional convergence problems. These convergence problems limit the size and complexity of the neural network architecture, and thus limit the complexity of the multipath scenario being modeled. These problems also affect accuracy of parameter estimation and signal classification.

BRIEF DESCRIPTION

In one aspect, a method for training a neural network to be configured to filter a multipath corrupted signal is provided. The method includes receiving, at the neural network, real or simulated multipath corrupted signal data, and training the neural network on the multipath corrupted signal data using a complex iterated least square thresholding algorithm (CILST) capable of processing both real and complex signals.

In another aspect, a method is provided. The method includes receiving a multipath corrupted signal at a computing device, and processing the multipath corrupted signal using a neural network that is trained using a complex iterated least square thresholding algorithm (CILST) capable of processing both real and complex signals.

In yet another aspect, a radar system configured to transmit and receive radar signals to determine a location of at least one object is provided. The radar system includes a computing device configured to receive a multipath corrupted radar signal, and process the multipath corrupted radar signal to generate a filtered radar signal, the multipath corrupted radar signal processed using a neural network that is trained using a complex iterated least square thresholding algorithm (CILST) capable of processing both real and complex signals.

DETAILED DESCRIPTION

Figure 1:
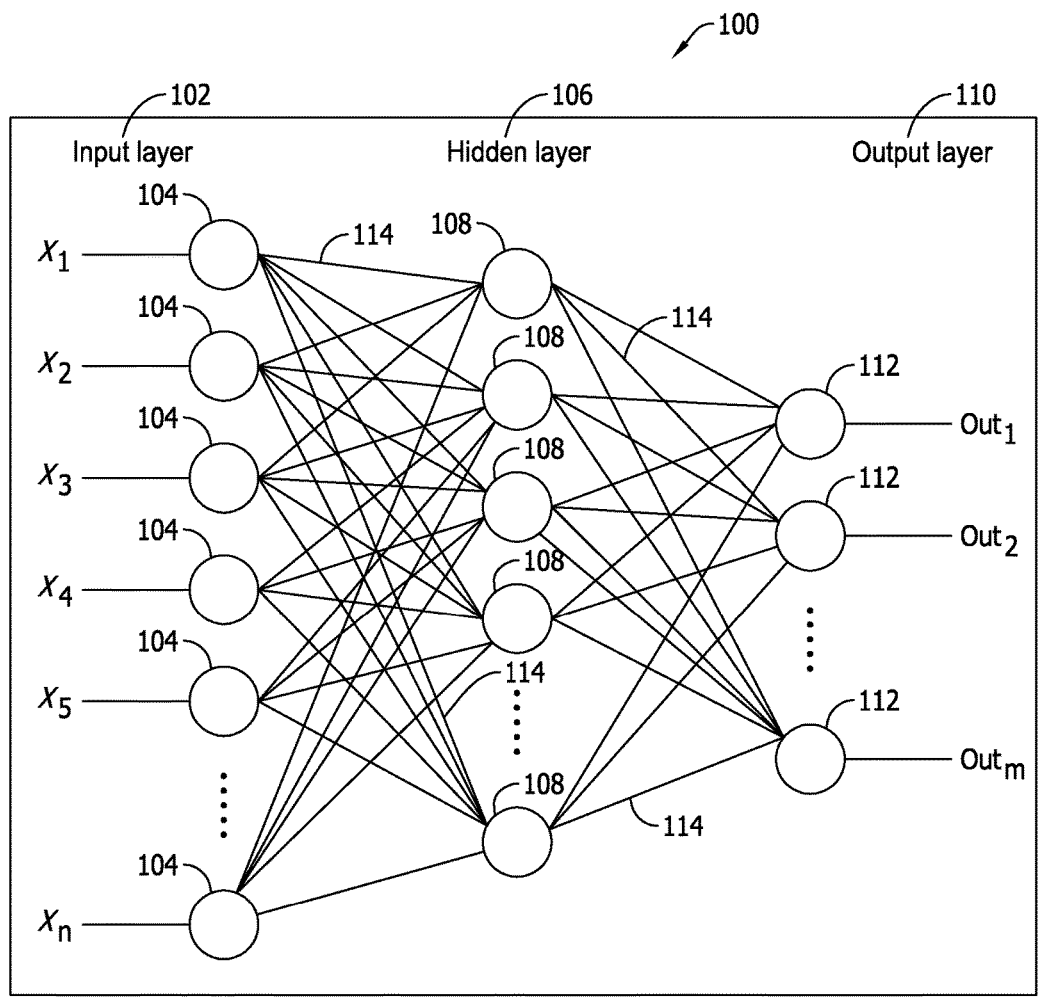
FIG. 1 is a schematic view of an exemplary neural network model.

The systems and methods described herein utilize a complex ILST (CILST) algorithm for complex-valued neural networks. This allows for improved filtering of multipath corrupted signals using complex-valued neural networks. Using the CILST algorithm described herein, a complex-valued neural network (CVNN) can be trained more accurately, and results will have better signal separation, more accurate parameter estimation, and more accurate signal classification in the presence of multipath, as compared to at least some known multipath filtering systems.

As used herein, "multipath corrupted signals" refers to radio signals from one source that are received at a receiver by two or more paths. Causes of multipath corruption including reflection and/or refraction from bodies of water, atmospheric phenomena, buildings, geographical features, etc. Multipath corruption generates significant complications when attempting to accurate locate signal sources and/or obtaining accurate outputs from signal processing techniques. Accordingly, using the systems and methods described herein to improve filtering multipath corrupted signals has many practical applications, including improved accuracy for radar location systems.

The systems and methods described herein have the ability to handle complex-valued signals naturally. This facilitates modeling complex electromagnetic wave propagation phenomena. In particular, utilizing the systems and methods described herein results in faster convergence in training for complex-valued neural networks, lower training error (especially for high dimension neural network systems with many hidden layer neurons), lower parameter estimation error, the ability to use higher dimensional complex-valued neural networks, and more efficient usage of low dimensional CVNNs. This provides several benefits directly to applications of CVNNs for multipath exploitation, but may also enhance CVNN performance in diverse areas such as biomedical imaging, automotive radars, electronic warfare, and communications and neuromorphic processing.

Research into complex-valued neural networks began with the goal of extending neural networks from having two binary output values to multiple values on a complex plane. Also proposed was the concept of time shift, which is compatible with phase shift in modern wave applications. The motivation for these initial enhancements came from adaptive signal processing in radar systems, communications, and other applications that deal with complex signals. To deal with a non-linear activation function in the case of a complex input, various proposals have been investigated, such as $f(z)=1/(1+\exp(-u))$, wherein $u=\Sigma w_i z_i$ or $f(z)=\text{sigmoid}(\text{Re}(z))+i*\text{sigmoid}(\text{Im}(z))$. These activation functions allowed extension of a basic backpropagation algorithm from real-valued to complex-valued networks. Many other activation functions have also been investigated.

Typical applications of CVNNs include applications for wave-related phenomena, such as acoustics, light, and electromagnetic waves. Consider a broadcasting system, namely, a radio or television system. In microwave and millimeter-wave frequencies, CVNNs have been used for adaptive designing of patch antennas, estimation of direction of arrival (DOA), adaptive processing of airborne and satellite interferomic radar images for globe observation, and ground penetrating radar for landmine detection. CVNNs have been used in neurophysiological analysis to investigate dynamics of the complex-valued Nagumo-Sato model, which represents time-sequential neuron activities, and in bioinformatics and image processing for analyzing stages of gene expression. CVNNs have also been used in communications for multiple-access communications and for constructing time-sequential associative memories. Further, CVNNs have been used for traffic-dependent control of traffic signals and other applications.

The original problem which had motivated the ILST algorithm was to find the height of an airborne target in rough terrain by using both direct radar return as well as one or more ground bounces. This problem was examined using neural networks and simple pulses. Since height finding is equivalent to measuring a time difference between a direct return and a specular return, the geometry of the situation needed to compute the actual height is not particularly important.

The problem can be stated as follows. Let p(t) be a single pulse return shape with a normalized amplitude. A multipath return would then look like:

$$s(t)=A_0 p(t-\tau_0)+A_1 p(t-\tau_1)+\ldots +A_N p(t-\tau_N)+n(t)$$

where $A_i$ is the amplitude of the ith return (the direct return being i=0), $\tau_i$ is the time delay, and n(t) is white Gaussian noise.

It is assumed that the $\tau_i$'s can be modeled as random variables where:

$$\tau_i = \Delta + \hat{\tau}_i, i > 0$$

where $\hat{\tau}_i$ is a random variable with a one-sided probability density function whose domain is $[0,\infty)$. Thus, the multipath returns are modeled as coming in sometime after the (missing) specular return. The problem is thus a parameter estimation problem for the unknown value $\Delta$, given s(t).

In fact, there are other random variables in this problem, namely $A_i$ and $\tau_0$. In general, these must be dealt with, but the problem can be simplified such that $A_0$ and $\tau_0$, the pulse $p(t)=\exp(-t^2/\sigma^2)$, and the probability density function of the $\tau_i$'s is fixed. For simplicity, the probability density function is selected to be a $\lambda$ distribution, namely the distribution of the absolute value of a normal random variable. This distribution in a real problem would be a function of terrain type, and may be updated from time to time in the real system. Also, the $\lambda$ distribution has no special relationship to any modeled terrain type, but is simply chosen as a starting point.

The idea for the original multipath problem is to simulate a plurality of multipath returns s(t), pick a neural network (NN) model, and then try various learning algorithms to see how well the NN could estimate (known) height (i.e., $\Delta$) from the simulated data. The measuring rod against which the NN was compared was a maximum likelihood estimator (MLE), or at least a close approximation to one.

In this study, the NN model used a standard three layer feed forward network with non-linear thresholding functions. The network had 16 input nodes (where 16 consecutive samples of s(t) were introduced as input), a hidden layer with various numbers of nodes, and a single output node for the height estimate. The problem was further simplified by fixing $A_0$, $\tau_0$, N=2 (generally) and $A_1=A_2=A_0$.

Then, a previous height finding algorithm using an MLE for a single specular return (N=1) was run on data with two and tree indirect returns (N=2 or 3). As expected, the results of running an inappropriate algorithm on the simulated data gave poor results.

Next, the same data was run through a NN for training, using 64 waveforms and back propagation (BP). A public domain program TLEARN was used without modification. TLEARN reports root mean square (RMS) error as it runs, and it was discovered that with the standard sigmoid thresholding function, $$t(x) = \frac{1}{1+\exp(-x^2)}$$

the RMS error for normalized data (i.e., data that was scaled to fall between 1 and 0 in value) could be pushed down to about 0.05. However, as this run involved approximately 5,000,000 learning cycles and ran many hours, it was not practical for researching variations of the original problem. Thus, a practical algorithm to fit NN-like models to data that was both fast and accurate was desired.

The real valued ILST algorithm will now be described. For the real valued ILST algorithm, the object is to do non-linear parameter estimation where the NN model is a three layer feed forward NN with given thresholding or activation functions, and the parameters to be estimated are weights, or coefficients. Note that besides backpropagation and its variations, there are standard "learning" algorithms for such NNs, such as radial basis functions methods.

The ILST algorithm works for any feed forward NN with any thresholding functions and any number of layers, but is particularly useful for a known three layer NN model 100, as shown in FIG. 1, with the sigmoid thresholding function. Model 100 includes an input layer 102 including a plurality of input nodes 104, a hidden layer 106 including a plurality of hidden nodes 108, and an output layer 110 including a plurality of output nodes 112.

In NN model 100, lines 114 connecting nodes 104, 108, and 112 represent weights (i.e., real values $w_{ij}$) which must be found through training. Hidden nodes 108 and output nodes 112 calculate a non-linear function of the inputs received at input nodes 104, given by $t(\Sigma_i w_{ij} x_i)$ for the jth node. For the estimation of multipath pulse time, a single output node 112 is used. This can be represented in a matrix format as shown below.

A mathematical notion is established as follows. Let A be a matrix of weights in an input column vector x to hidden layer 106 with n hidden nodes 108, and t an invertible thresholding function. Then, the output of hidden nodes 108 is $z=t(Ax)$. Let b be the row vector of weights from hidden layer 106 to the single output node 112 such that $y=t(bz)$ is the final output. The estimation problem is to find the "best" matrix A and vector b so that the model closely fits the data input matrix and output vector $\{\hat{x},\hat{y}\}$. Let $A_j$ be the jth row of A. Then, the algorithm works as follows.

In a first step, a linear least-square problem is solved for a first hidden node 108 $t^{-1}(t^{-1}(\hat{y})) \approx A_1[\hat{x},1]$ for $A_1$ where [•,1] denotes a matrix whose last column is of the appropriate size and all 1's. This first step finds a NN whose one hidden node 108 gives the best linear fit to the data. In a second step, the error from this fit is computed at the hidden node 108 via $e_1=t^{-1}(\hat{y})-z_1$ where $z_1=t(A_1[\hat{x},1])$. In a third step, a new fit of $t^{-1}(\text{rescale}(e_1)) \approx A_2[\hat{x},1]$ is performed, where "rescale" rescales the range of $e_1$ to lie within the range of t. The second and third steps are cycled through until all hidden nodes 108 are taken care of. In a last step, the hidden node vector data ($z'_j$s) is fit to $t^{-1}(\hat{y})$ by solving the linear least-square problem $t^{-1}(\hat{y}) \approx b[z_1, z_2, \ldots, z_n, 1]$.

One feature of the basic algorithm is that in the third step, each error $e_j$ is scaled linearly to fill up the range of t. Otherwise, if the range of $e_j$ values lie within a "nearly" linear range of t, the previous algorithm will stop converging. On the other hand, if the range of $e_j$ is much larger than the range of t, then computing $t(t^{-1}(\text{trunc}(e_j)))$ would not bear much resemblance to $e_j$.

Figure 2:
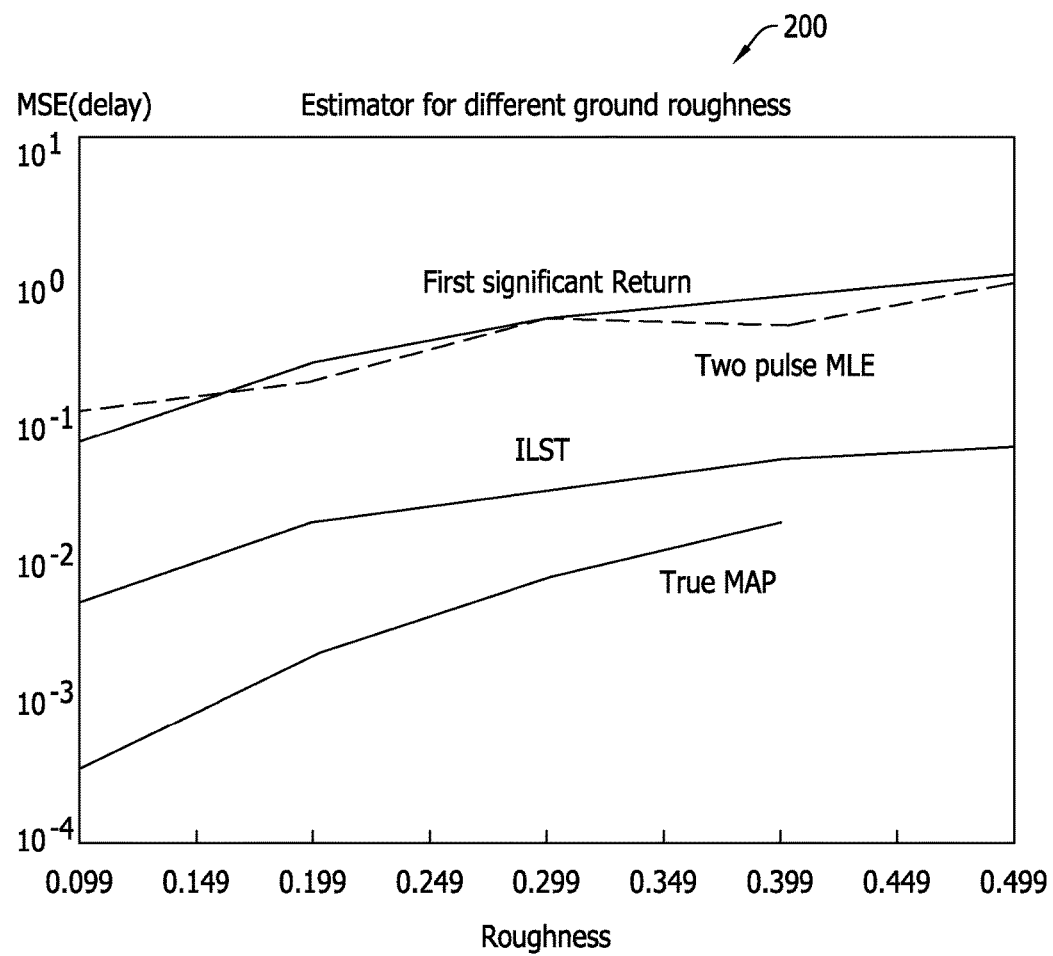
FIG. 2 is a graph comparing performance of an iterated least square thresholding (ILST) algorithm with maximum likelihood estimates of best possible performance of any possible algorithm.

Previous comparisons with back propagation on large training sets demonstrate that ILST is significantly more robust. Often, BP fails to converge at all. In addition, ILST can often do better than the "optimal" two pulse maximum likelihood method for a single multipath return when the MLE does not include apriori information (as would a maximum apriori method (MAP)). In FIG. 2, results of applying the ILST algorithm were compared to the MLE of the parameter $\Delta$ of a data set whose probability density function is given by $f\lambda(x-\Delta)$ where:

$$f_X(x) = \frac{2}{\sqrt{2}\,\sigma\Gamma(1/2)} \exp(-x^2/(2\sigma^2))U(x)$$

This is the probability density function for the $\lambda$ distribution. Because the mean of the function is given by $$\frac{\sqrt{2}\,\sigma}{\sqrt{\pi}},$$

the MLE of $\Delta$ is simply the sample average minus $$\frac{\sqrt{2}\,\sigma}{\sqrt{\pi}}.$$

The results of this comparison are shown in graph 200 of FIG. 2.

The complex ILST algorithm (CILST) will now be described in detail through a particular application. Whereas height finding/identification of first return is a particular multipath exploitation example, more general problems occur when dealing with multiple radar or communications multipath corrupted signals in urban clutter. One possible radar application would be to create an urban electromagnetic model of a "city" (i.e., any suitable geographic area) with traffic, and, through simulation, fly a radar above the city while tracking the vehicles. To help with tracking, it is important to return a better estimate of range than multipath returns would ordinarily allow (i.e., using the ILST algorithm described above), as this would clean up inputs for tracking. The range estimate is related to the "first" radar return, but is more complicated. Accordingly, one approach is to train the ILST algorithm using an urban model over a grid of points covering a complete "city" against the correct "delay". Subsequently, when real radar returns are processed by the algorithm, a better estimate of delay should result.

Figure 3:
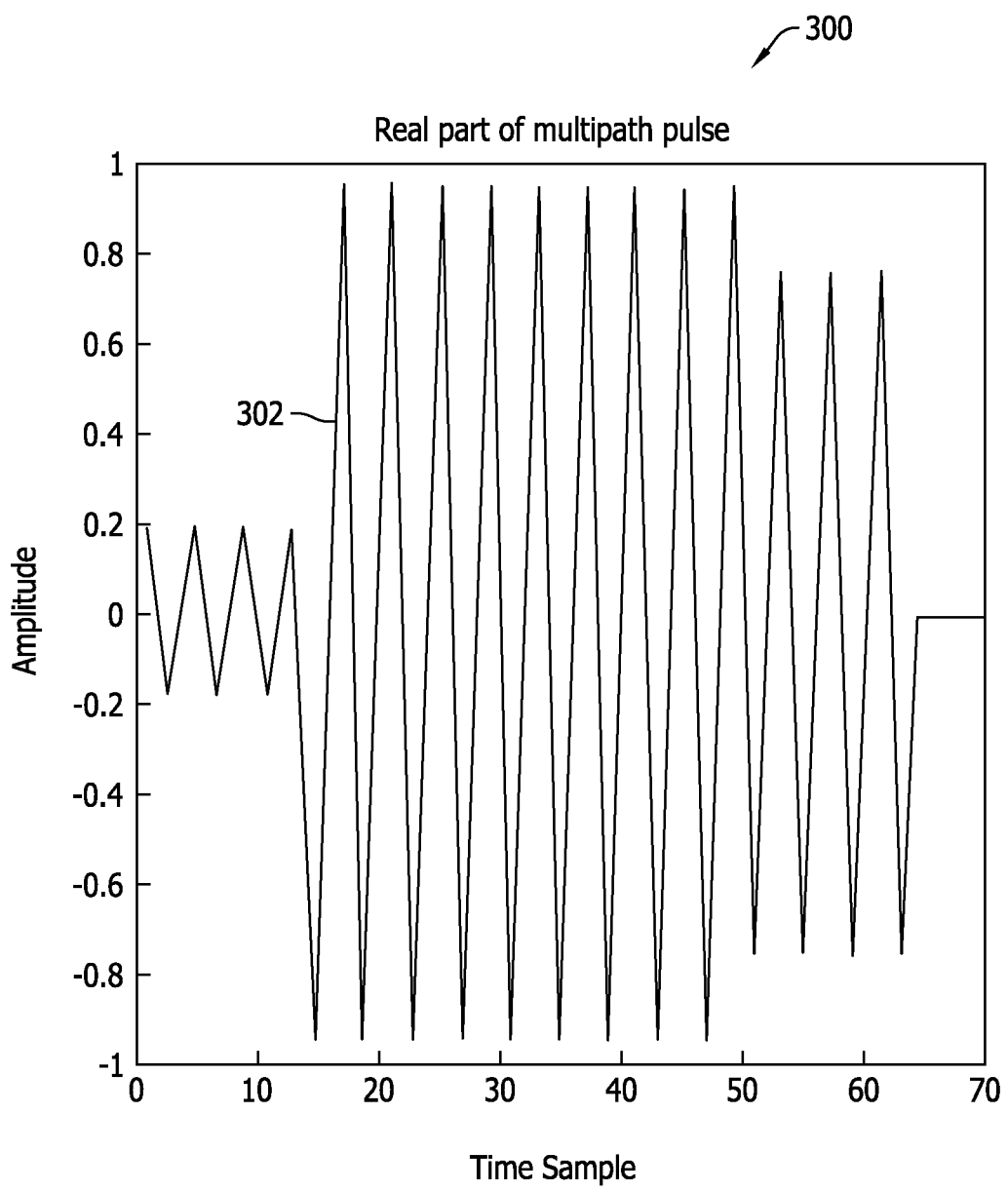
FIG. 3 is a graph showing the real part of an exemplary complex multipath pulse.

For this problem, the focus moves from a simple real exponential pulse model to a model that uses a sampled complex IF version of the radar return. Also, data which uses multipath more typical of multipath return from buildings should be explored. Accordingly, in the exemplary implementation, a Rayleigh model is chosen for the multipath delay, with decaying amplitude and random phases, further necessitating complex-valued processing. For simulation purposes, computer code that simulates the type of multipath seen in an urban setting is used. Alternatively, a complex urban model could be generated for simulation purposes. FIG. 3 is a graph 300 showing the real part of a complex multipath pulse 302, with a particular center frequency and multipath added on. As demonstrated by FIG. 3, it may be difficult to define a beginning of pulse 302.

With a complex modulated pulse at offset center frequencies, such as pulse 302, the original ILST algorithm is insufficient. Notably, the original ILST algorithm only works on real signals, not complex signals. Further, using on the real part of the complex signal is unworkable, because the MSE from the original ILST does not converge. Accordingly, a complex ILST (CILST) is utilized.

A mathematical notion for the CILST is established as follows. Let A be a complex matrix of weights from a complex input sample vector x to hidden layer 106 with n hidden nodes 108, and t an invertible threshold function that produces a positive real output from a complex input. Then, the output of hidden nodes 108 is the real valued $z=t(Ax)$. Let b be the complex row vector of weights from hidden layer 106 to the single output node 112 such that $y=t(bz)$ is the final real output which produces a time delay of pulse 302. Here, the complex sigmoid function is defined by:

$$t(z) = \left|\frac{1}{1+e^{-z}}\right|.$$

The estimation problem is to find the "best" complex matric A and complex vector b so that the model closely fits the data input matrix and output vector $\{\hat{x},\hat{y}\}$. Let $A_j$ be the jth row of A. Then, the algorithm works as follows.

In a first step, a linear least-square problem is solved for a first hidden node 108 $t^{-1}(t^{-1}(\hat{y})) \approx A_1[\hat{x},1]$ for $A_1$ where [•,1] denotes a matrix whose last column is of the appropriate size and all 1's. This first step finds a NN whose one hidden node 108 gives the best linear fit to the data. In a second step, the error from this fit is computed at the hidden node 108 via $e_1=t^{-1}(\hat{y})-z_1$ where $z_1=\min\{|t(A_1[\hat{x},1])|,1\}$. In a third step, a new fit of $t^{-1}(\text{rescale}(e_1))\approx A_2[\hat{x},1]$ is performed, where "rescale" rescales the range of $e_1$ to lie within the range of t. The second and third steps are cycled through until all hidden nodes 108 are taken care of. In a last step, the hidden node vector data ($z'_j$s) is fit to $t^{-1}(\hat{y})$ by solving the linear least-square problem $t^{-1}(\hat{y})\approx b[z_1, z_2, \ldots, z_n, 1]$ and computing the final real result $\min\{|t(b[z_1, z_2, \ldots, z_n, 1])|,1\}$.

One improvement beyond the original ILST algorithm is controlling the sizes of A and b. That is, if the original ILST algorithm is run on typical data, solving the linear least-square problem generates relatively large values for the weights of the NN. Thus, the NN may be too sensitive to small variations in the input (Note: this does not occur with BP and is one of its traditional advantages). The way to control sizes of these elements is to augment each least-square problem by including an identity matrix times a controllable parameter, $\lambda$. For example, the first step solves:

$$\begin{bmatrix} t^{-1}(t^{-1}(\hat{y})) \\ 0 \end{bmatrix} \approx A_1 \begin{bmatrix} \hat{x} & 1 \\ \lambda I & 0 \\ 0 & \lambda \end{bmatrix}$$

This problem then minimizes both a squared error of the data as well as the $L_2$ norm of the elements of $A_1$. Of course, as $\lambda$ is increased and the algorithm becomes more robust, the mean squared error (MSE) becomes larger.

Figure 4:
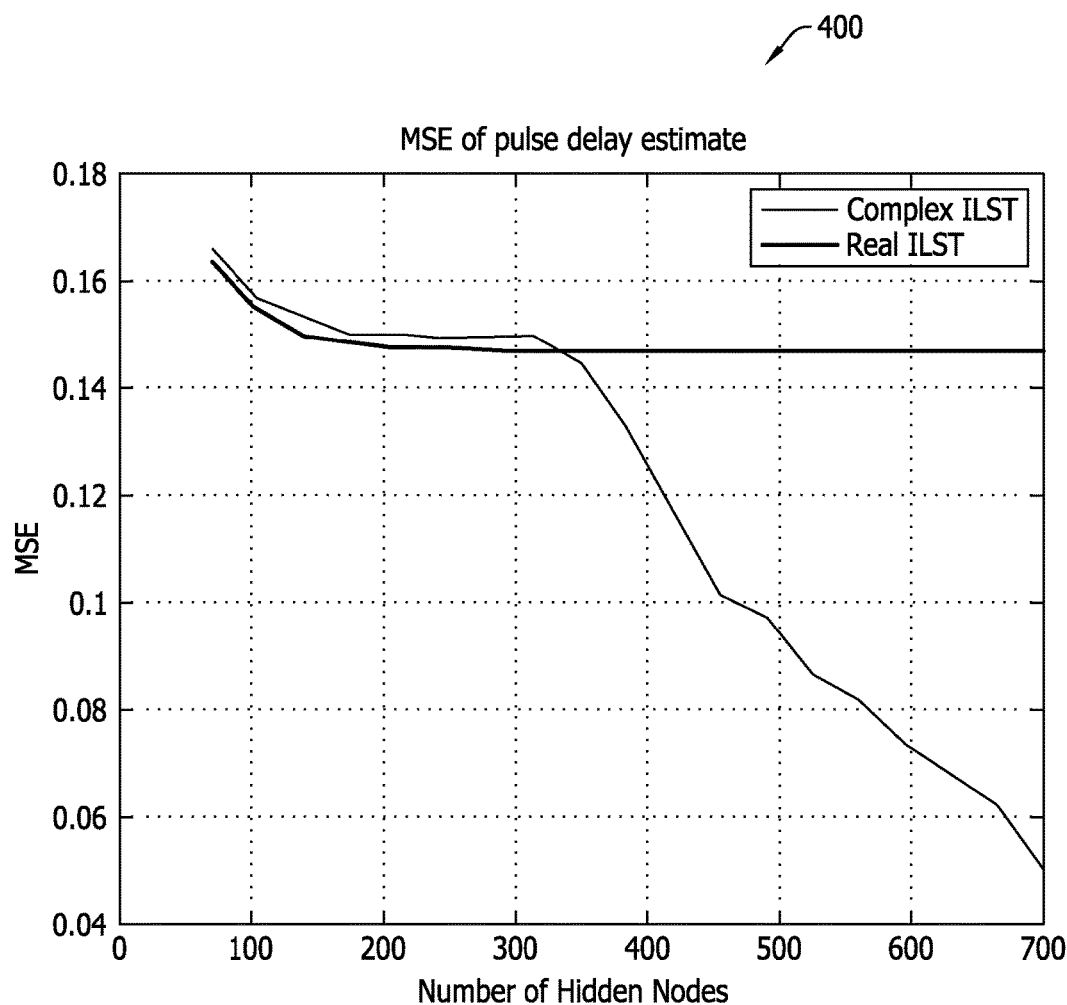
FIG. 4 is a graph comparing performance of an ILST with a complex ILST (CILST) algorithm.

A second improvement of the CILST is to iterate by assuming that there are $n_1>n$ hidden nodes 108. After the original ILST algorithm is run on $n_1$ nodes and the least-square fit is done to find b, the n nodes corresponding to the largest values of b are kept and the rest are discarded. Then this process is iterated to lower the MSE. The results of this are shown in graph 400 of FIG. 4. Clearly, graph 400 demonstrates how the original ILST algorithm hits a lower MSE limit, while the CILST algorithm continues to drive down the MSE as the complexity of the NN increases (as it should). The following parameters drove the results in FIG. 4: a sampling frequency, $f_s$, of 1e5, a center frequency, $f_c$, of $f_s/4$, a pulse width of 5e-4, 3 multipath rays, multipath amplitudes decreased by 10× per reflection and randomized, uniformly random phases, Rayleigh parameters for delay of $mu_R$=1e-4 and $\sigma_R$=1e-4, 70 time samples per signal, 1000 training signals, and $\lambda$ of 0.0000001.

Figure 5:
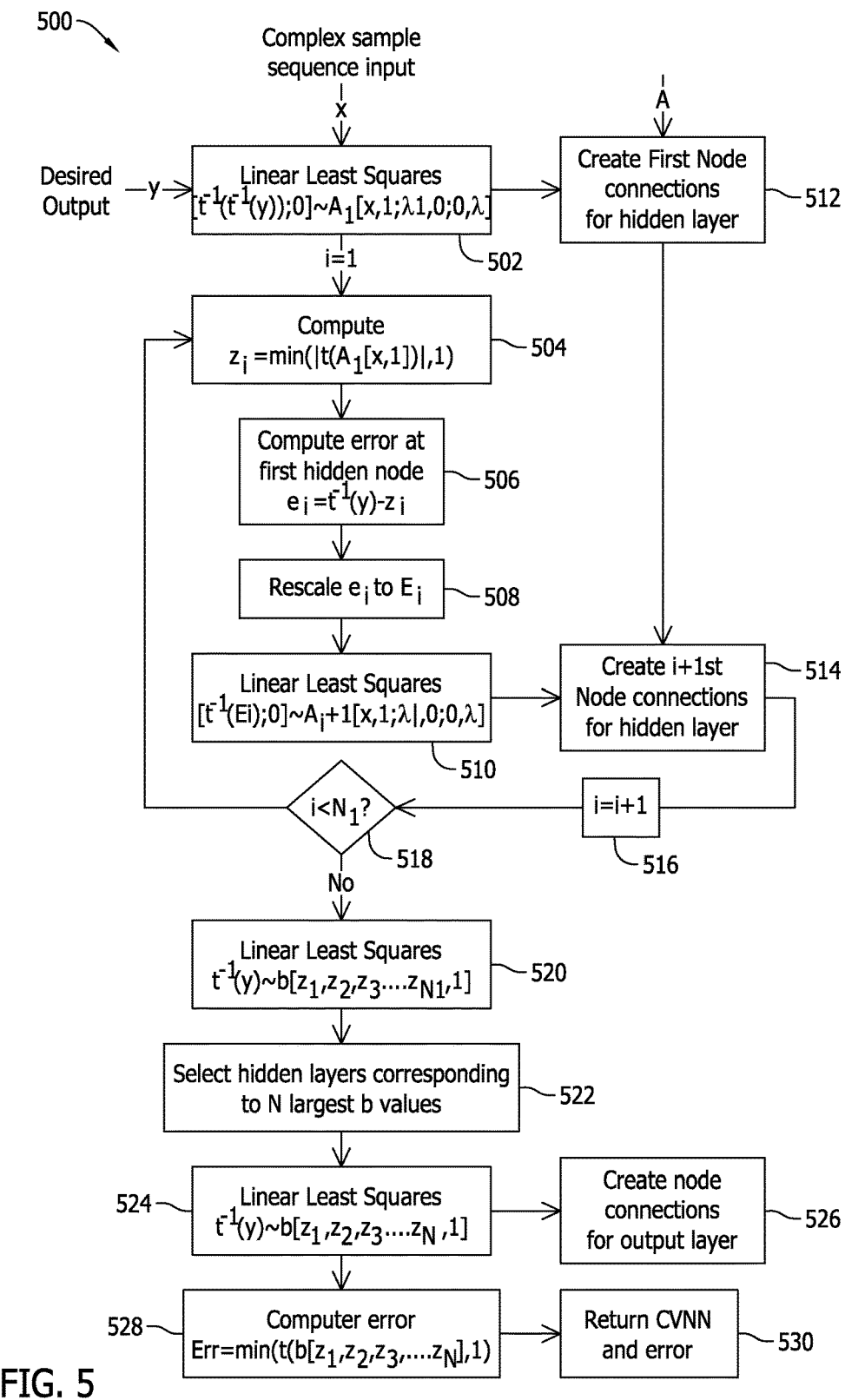
FIG. 5 is a flowchart of an exemplary CILST algorithm.

FIG. 5 is flowchart 500 of the exemplary CILST algorithm.

Block 502 receives a complex sample sequence input and the desired output, y, and generates the linear least-square problem. i is set to 1, and flow proceeds to block 504, where $z_1=\min\{|t(A_1[\hat{x},1])|,1\}$ is calculated and provided to block 506, where the error $e_i$ is calculated. At block 508, the error $e_i$ is rescaled, and the linear least-square problem is generated again at block 510.

From block 502 flow also proceeds to block 512, where A is received and first node connections are created for hidden layer 106. Blocks 510 and 512 both flow into block 514, where the i+1st node connection for hidden layer 106 is created. Flow then proceeds to block 516, where i is incremented to i+1. At block 518, if i<$N_1$, flow returns to block 504. Otherwise, flow proceeds to block 520, where the linear least-square problem is generated again. At block 522, hidden layers 106 corresponding to the N largest b values are selected, and the linear least-square problem is generated again at block 524. Flow proceeds to block 526, where node connections are created for output layer 510, and to block 528, where an error, Err, is calculated. At block 530, the CVNN is returned (e.g., displayed to a user) with the error Err.

Figure 6:
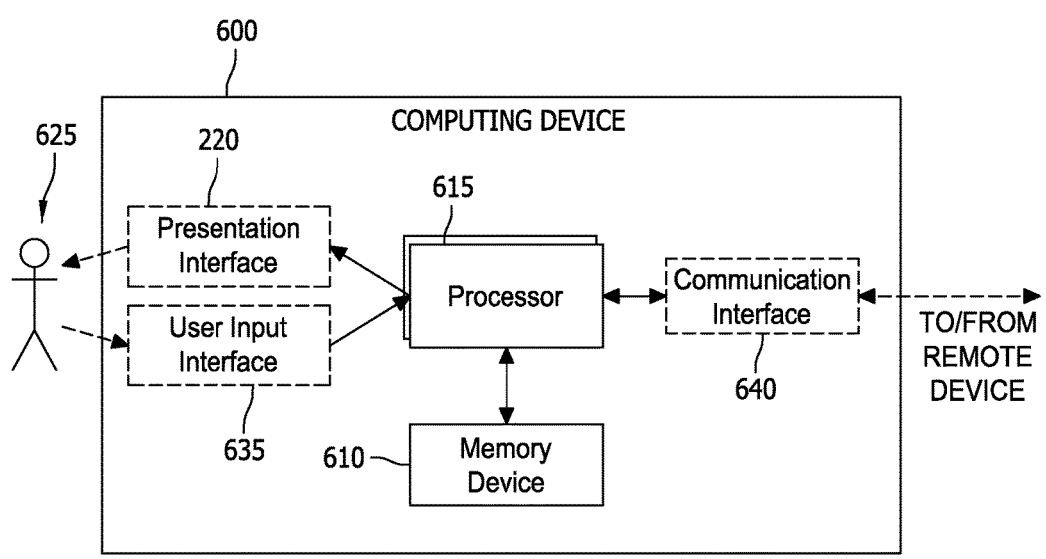
FIG. 6 is a block diagram of a computing device that may be used to implement the CILST algorithm shown in FIG. 5.

FIG. 6 is a block diagram of an exemplary computing device 600 that may be used to implement operation of the CILST algorithm. Computing device 600 includes at least one memory device 610 and a processor 615 that is coupled to memory device 610 for executing instructions. In some implementations, executable instructions are stored in memory device 610. In the exemplary implementation, computing device 600 performs one or more operations described herein by programming processor 615. For example, processor 615 may be programmed by encoding an operation as one or more executable instructions and by providing the executable instructions in memory device 610.

Processor 615 may include one or more processing units (e.g., in a multi-core configuration). Further, processor 615 may be implemented using one or more heterogeneous processor systems in which a main processor is present with secondary processors on a single chip. In another illustrative example, processor 615 may be a symmetric multi-processor system containing multiple processors of the same type. Further, processor 615 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary implementation, processor 615 executes CILST algorithm, as described herein.

In the exemplary implementation, memory device 610 is one or more devices that enable information such as executable instructions and/or other data to be stored and retrieved. Memory device 610 may include one or more computer readable media, such as, without limitation, dynamic random access memory (DRAM), static random access memory (SRAM), a solid state disk, and/or a hard disk. Memory device 610 may be configured to store, without limitation, application source code, application object code, source code portions of interest, object code portions of interest, configuration data, execution events and/or any other type of data.

In the exemplary implementation, computing device 600 includes a presentation interface 620 that is coupled to processor 615. Presentation interface 620 presents information to a user 625. For example, presentation interface 620 may include a display adapter (not shown) that may be coupled to a display device, such as a cathode ray tube (CRT), a liquid crystal display (LCD), an organic LED (OLED) display, and/or an "electronic ink" display. In some implementations, presentation interface 620 includes one or more display devices.

In the exemplary implementation, computing device 600 includes a user input interface 635. User input interface 635 is coupled to processor 615 and receives input from user 625. User input interface 635 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 620 and user input interface 635.

Computing device 600, in the exemplary implementation, includes a communication interface 640 coupled to processor 615. Communication interface 640 communicates with one or more remote devices. To communicate with remote devices, communication interface 640 may include, for example, a wired network adapter, a wireless network adapter, and/or a mobile telecommunications adapter.

The systems and methods described herein facilitate fast training of complex-valued neural networks (CVNNs) for use in multipath exploitation, as well as other applications of CVNNs. The techniques described herein use an algorithm that generates a CVNN design with a fixed set of steps, unlike other iterative methods which may have an unknown and relatively lengthy training period. The methods and systems described herein provide many advantages, while preserving standard CVNN structure. This means that CVNNs may be used more easily with a wider variety of applications and may be used to quickly test a new application to determine how useful CVNN methods are expected to be. Utilizing the systems and methods described herein results in faster convergence in training for complex-valued neural networks, lower training error (especially for high dimension neural network systems with many hidden layer neurons), lower parameter estimation error, the ability to use higher dimensional complex-valued neural networks, and more efficient usage of low dimensional CVNNs.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for training a neural network, said method comprising:
   receiving, at the neural network, from a signal receiver, real or simulated multipath corrupted signal data;
   training the neural network on the multipath corrupted signal data using a complex iterated least square thresholding algorithm (CILST) capable of processing both real and complex signals, wherein the CILST algorithm uses complex arithmetic to process the real and complex signals by:
      for each of a plurality of hidden nodes of the neural network:
         solving, using the CILST algorithm, a complex linear least-square problem for the hidden node of the neural network to determine a linear fit to the multipath corrupted signal data;
         computing, using the CILST algorithm, an error from the linear fit at the hidden node; and
         performing, using the CILST algorithm, a new fit; and
      fitting, using the CILST algorithm, vector data for the plurality of hidden nodes by solving the complex linear least-square problem and computing a final real result; and
   filtering a multipath corrupted signal using the CILST-trained neural network to determine a location of at least one object.

2. A method in accordance with claim 1, wherein receiving real or simulated multipath corrupted signal data comprises receiving real or simulated multipath corrupted signal data at a complex-valued neural network.

3. A method in accordance with claim 1, wherein receiving real or simulated multipath corrupted signal data comprises receiving real or simulated multipath corrupted signal data at a neural network that includes an input layer having a plurality of input nodes, a hidden layer having the plurality of hidden nodes, and an output layer having a plurality of output nodes.

4. A method in accordance with claim 1, wherein solving a complex linear least-square problem for the hidden node comprises solving the complex linear least-square problem for the hidden node in accordance with $t^{-1}(t^{-1}(\hat{y})) \approx A_1[\hat{x},1]$ for $A_1$, where $[\bullet,1]$ denotes a matrix whose last column is all 1's, A is a complex matrix of weights from a complex input sample vector x, $A_j$ is a jth row of A, and t is an invertible threshold function that produces a positive real output, y, from a complex input.

5. A method in accordance with claim 4, wherein the invertible threshold function t is defined as $$t(z) = \left| \frac{1}{1+e^{-z}} \right|.$$

6. A method in accordance with claim 4, wherein computing an error comprises computing an error according to $e_1 = t^{-1}(\hat{y}) - z_1$, where $z_1 = \min\{|t(A_1[\hat{x},1])|,1\}$.

7. A method comprising:
   receiving, from a signal receiver, a multipath corrupted signal at a computing device;
   processing the multipath corrupted signal using a neural network that is trained using a complex iterated least square thresholding algorithm (CILST) capable of processing both real and complex signals, wherein the CILST algorithm uses complex arithmetic to process the real and complex signals by:
      for each of a plurality of hidden nodes of the neural network:
         solving, using the CILST algorithm, a complex linear least-square problem for the hidden node of the neural network to determine a linear fit to the multipath corrupted signal data;
         computing, using the CILST algorithm, an error from the linear fit at the hidden node; and
         performing, using the CILST algorithm, a new fit; and
      fitting, using the CILST algorithm, vector data for the plurality of hidden nodes by solving the complex linear least-square problem and computing a final real result; and
   determining a location of at least one object from the multipath corrupted signal processed using the CILST-trained neural network.

8. A method in accordance with claim 7, wherein processing the multipath corrupted signal comprises processing the multipath corrupted signal using a complex-valued neural network, and wherein the method further comprises displaying the complex-valued neural network to a user.

9. A method in accordance with claim 7, wherein processing the multipath corrupted signal comprises processing the multipath corrupted signal using a neural network that includes an input layer having a plurality of input nodes, a hidden layer having the plurality of hidden nodes, and an output layer having a plurality of output nodes.

10. A method in accordance with claim 7, wherein solving a complex linear least-square problem for the hidden node comprises solving the complex linear least-square problem for the hidden node in accordance with $t^{-1}(t^{-1}(\hat{y})) \approx A_1[\hat{x},1]$ for $A_1$, where $[\bullet,1]$ denotes a matrix whose last column is all 1's, A is a complex matrix of weights from a complex input sample vector x, $A_j$ is a jth row of A, and t is an invertible threshold function that produces a positive real output, y, from a complex input.

11. A method in accordance with claim 10, wherein the invertible threshold function t is defined as $$t(z) = \left| \frac{1}{1+e^{-z}} \right|.$$

12. A method in accordance with claim 10, wherein computing an error comprises computing an error according to $e_1 = t^{-1}(\hat{y}) - z_1$, where $z_1 = \min\{|t(A_1[\hat{x},1])|,1\}$.

13. A radar system configured to transmit and receive radar signals to determine a location of at least one object, said radar system comprising a computing device configured to:
receive, from a signal receiver, a multipath corrupted radar signal;
process the multipath corrupted radar signal to generate a filtered radar signal, the multipath corrupted radar signal processed using a neural network that is trained using a complex iterated least square thresholding algorithm (CILST) capable of processing both real and complex signals, wherein the CILST algorithm uses complex arithmetic to process the real and complex signals by:
for each of a plurality of hidden nodes of the neural network:
solving, using the CILST algorithm, a complex linear least-square problem for the hidden node of the neural network to determine a linear fit to the multipath corrupted signal data;
computing, using the CILST algorithm, an error from the linear fit at the hidden node; and
performing, using the CILST algorithm, a new fit; and
fitting, using the CILST algorithm, vector data for the plurality of hidden nodes by solving the complex linear least-square problem and computing a final real result; and
determine a location of the at least one object from the multipath corrupted signal processed using the CILST-trained neural network.

14. A radar system in accordance with claim 13, wherein the neural network is a complex-valued neural network.

15. A radar system in accordance with claim 13, wherein the neural network includes an input layer having a plurality of input nodes, a hidden layer having the plurality of hidden nodes, and an output layer having a plurality of output nodes.

16. A radar system in accordance with claim 13, wherein solving a complex linear least-square problem for the hidden node includes solving the complex linear least-square problem for the hidden node in accordance with $t^{-1}(t^{-1}(\hat{y})) \approx A_1[\hat{x},1]$ for $A_1$, where $[\bullet,1]$ denotes a matrix whose last column is all 1's, A is a complex matrix of weights from a complex input sample vector x, $A_j$ is a jth row of A, and t is an invertible threshold function that produces a positive real output, y, from a complex input.

17. A radar system in accordance with claim 16, wherein the invertible threshold function t is defined as $$t(z) = \left| \frac{1}{1+e^{-z}} \right|.$$

* * * * *